United States Patent [19]

Suzuki et al.

[11] Patent Number: 5,216,080

[45] Date of Patent: Jun. 1, 1993

[54] RUBBER COMPOSITION

[75] Inventors: Fumitoshi Suzuki; Shuichi Akita; Hiroyuki Watanabe, all of Yokohama, Japan

[73] Assignee: Nippon Zeon Co., Ltd., Tokyo, Japan

[21] Appl. No.: 523,539

[22] Filed: May 15, 1990

[30] Foreign Application Priority Data

May 15, 1989 [JP] Japan .................... 1-121234

[51] Int. Cl.⁵ .................... C08K 5/07; C08L 53/02
[52] U.S. Cl. .................... 525/153; 525/125; 525/155; 525/185; 525/186; 525/189; 525/233; 525/280; 525/299; 525/300
[58] Field of Search ............ 525/233, 153, 125, 155, 525/185, 186, 189, 299, 300, 280

[56] References Cited

U.S. PATENT DOCUMENTS 4,334,567  6/1982  Bond .................... 526/340
4,647,625  3/1987  Aonuma et al. .................... 525/232

*Primary Examiner*—Jacob Ziegler
*Attorney, Agent, or Firm*—Sherman and Shalloway

[57] ABSTRACT

A rubber composition comprising, as rubber components, 10–40 % by weight of (1) a styrene-butadiene copolymer rubber obtained by solution polymerization, having a styrene content of less than 20% by weight and a trans-1,4 bond content in butadiene portion, of more than 90% by weight and 60–90% by weight of (2) a diene rubber other than the styrene-butadiene copolymer rubber (1), having a glass transition temperature of −60° C. or below.

10 Claims, No Drawings

RUBBER COMPOSITION

The present invention relates to a rubber composition comprising a solution polymerization styrene-butadiene copolymer rubber having a high trans-1,4 bond content and a diene rubber other than said styrene-butadiene copolymer rubber. More particularly, the present invention relates to a rubber composition comprising a styrene-butadiene copolymer rubber having a high trans-1,4 bond content, obtained by using a composite catalyst containing an alkaline earth metal and a diene rubber having a relatively low glass transition temperature.

Diene rubbers have been used as a main rubber material in large-sized tires for trucks, buses and air planes. Generally, natural rubber is used for improvement of heat-up and fracture resistance, in particular; styrene-butadiene copolymer rubber is used for improvement of abrasion resistance and cutting resistance; and polybutadiene rubber is used for improvement of abrasion resistance. Rubber compositions obtained by blending these rubber materials in appropriate proportions have been used so as to meet desired improvements.

Generally in large-sized tires, particularly their tread portions subjected to very high loads, natural rubber is used as a main rubber material and a polybutadiene rubber is blended thereto.

Abrasion resistance and crack resistance are important requirements for large-sized tires, but they are opposing properties. Meanwhile, in a natural rubber-polybutadiene blend, a higher polybutadiene content gives higher abrasion resistance but lower crack resistance, while a lower polybutadiene content gives higher crack resistance but lower abrasion resistance.

Hence, various studies were made for improvement of polybutadiene rubber and many study results were reported. For example, there were proposed a method using a polybutadiene rubber having a wide molecular weight distribution for improvement of tack and green strength (Japanese Laid-Open Patent Publication No. 45337/1984) and a method using a polybutadiene rubber of high molecular weight for improvement of abrasion resistance. This latter method can give improved abrasion resistance but invites reduction in processability.

With the recent increase in paved roads, high ways and gasoline price and the people's orientation to energy saving, rolling resistance (for economy) and skid resistance and high-speed durability (for safety) have been very important requirements not only for passenger car tires but also for large-sized tires, in addition to abrasion resistance and cutting and chipping resistance.

That is, there has come to be required, from a social need, a large-sized tire keeping conventional levels of skid property and abrasion resistance and having reduced rolling resistance. In general, reduction in rolling resistance brings about reduction in wet skid resistance. Accordingly, rolling resistance and wet skid resistance were two opposing properties. However, it was found that this opposing relationship between the two properties is broken by the use of a solution polymerization styrene-butadiene copolymer rubber of high vinyl content type (hereinafter abbreviated to "solution polymerization SBR") (U.S. Pat. No. 4,334,567). This solution polymerization SBR is being popularly used in low fuel consumption tires for passenger cars. Also, it was proposed by the present applicant that the terminal modification of the above SBR with a compound having a particular atomic group gives further improved fuel consumption (U.S. Pat. No. 4,647,625).

However, these solution polymerization SBR's of high vinyl content, when used in tires for trucks and buses, are very inferior in abrasion resistance and cannot be put into said practical applications. Further, said SBR's have no sufficient strengths for large-sized tires. The abrasion resistance of the SBR's is insufficient even when used in passenger car tires, and needs improvement.

The object of the present invention is to provide a rubber composition with improved strength and abrasion resistance which can be used even in production of large-sized tires.

The present inventors made study in order to attain the above object and, as a result, found that a solution polymerization styrene-butadiene copolymer rubber having a very high trans-1,4 bond content shows very superior properties, particularly, high green strength, high fracture strength and high abrasion resistance and, when blended with a diene rubber such as natural rubber or the like in appropriate proportions, gives a composition having a higher balance in fracture strength, abrasion resistance and crack resistance.

The present inventors also found that the addition of a particular atomic group to the molecular chain of the above copolymer rubber gives further improvements in abrasion resistance and strength.

According to the present invention, there is provided a rubber composition comprising, as rubber components, 10–40% by weight of (1) a styrene-butadiene copolymer rubber obtained by solution polymerization, having a styrene content of less than 20% by weight and a trans-1,4 bond content in butadiene portion, of more than 90% by weight and 60–90% by weight of (2) a diene rubber other than the styrene-butadiene copolymer rubber (1), having a glass transition temperature of $-60°$ C. or below.

The styrene-butadiene copolymer rubber obtained by solution polymerization, used in the present invention, has a styrene content of less than 20% by weight and a trans-1,4 bond content of butadiene content, of more than 90% weight. When the styrene content is more than 10% by weight, the resulting rubber composition has a reduced abrasion resistance. The styrene content is preferably 5–15% by weight. When the trans-1,4 bond content is less than 90% by weight, the resulting rubber composition has reduced abrasion resistance and reduced fracture strength. The above copolymer rubber is ordinarily polymerized by using a composite catalyst containing an alkaline earth metal. Although no styrene-butadiene copolymer having a trans-1,4 bond content of more than 95% by weight can be obtained currently, such a copolymer, if obtained, should exhibit the meritorious effect of the present invention.

The rubber composition of the present invention comprises such a styrene-butadiene rubber copolymer rubber and a diene rubber having a glass transition temperature of $-60°$ C. or below.

The proportion of the styrene-butadiene copolymer rubber used in the composition is 10–40% by weight. When the proportion is less than 10% by weight, the resulting composition has no reduced abrasion resistance and, when the proportion is more than 40% by weight, the resulting composition has improved abrasion resistance but inferior in fracture strength and crack resistance. The proportion of the styrene-butadiene copolymer rubber is preferably 15–30% by weight.

When the diene rubber has a Tg of higher than −60° C., the resulting composition is inferior in durability, in particular, when used in large-sized tires which are used under far severer conditions as compared with passenger car tires. The proportion of the diene rubber used in the rubber composition is 60–90% by weight. When the proportion is less than 60% by weight, the resulting composition is inferior in fracture strength, cutting resistance and crack resistance. When the proportion is more than 90% by weight, the resulting composition has reduced abrasion resistance. The proportion of the diene rubber is preferably 70–85% by weight.

As the diene rubber, there can be mentioned natural rubber, a polybutadiene rubber, a polyisoprene rubber, a butadiene-styrene copolymer rubber, a butadiene-isoprene copolymer rubber, etc. The diene rubber is not restricted to these rubbers.

The styrene-butadiene copolymer rubber having a high trans-1,4 bond content, used in the present invention, can be ordinarily obtained by copolymerizing butadiene and styrene using a composite catalyst containing an alkaline earth metal, there can be mentioned, for example, catalyst systems containing, as a main component, a compound of Ba, Sr, Cr or the like, disclosed in U.S. Pat. Nos. 3,946,385, 3,992,561, 4,079,176, 4,092,268, 4,112,210, 4,129,705, 4,260,519 and 4,297,240. The composite catalyst is not restricted to these.

The thus obtained styrene-butadiene copolymer rubber having active terminals can be subjected to terminal modification by reacting it with an N-substituted amino(thio)ketone, an N-substituted amino(thio)aldehyde or a compound having, in the molecule, an atomic group represented by the general formula

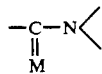

(M represents an oxygen or sulfur atom). When the resulting terminal-modified styrene-butadiene copolymer rubber is used as the styrene-butadiene copolymer rubber (1) of the present invention, the resulting rubber composition has improved rolling resistance, in addition to the above-mentioned advantages.

As the organic compound used in the above terminal modification reaction, there can be mentioned N-substituted aminoketones such as 4-dimethylamino-benzophenone, 4-diethylaminobenzophenone, 4-di-tert-butylaminobenzophenone, 4-diphenylbenzophenone, 4,4′-bis(dimethylamino) benzophenone, 4,4′-bis(diethylamino)-benzophenone, 4,4′-bis(di-tert-butylamino)-benzophenone, 4,4′-bis(diphenylamino)benzophenone, 4,4′-bis(divinyl-amino) benzopehnone, 4-dimethyl-minoacetophenone, 4-diethylaminoacetophenone, 1,3-bis(diphenylamino)-2-propanone, 1,7-bis(methylethylamino)-4-heptanone and the like, and their corresponding N-substituted aminothio-ketones; N-substituted aminoaldehydes such as 4-dimethyl-aminobenzaldehyde, 4-diphenylaminobenzaldehyde, 4-divinylaminobenzaldehyde and the like, and their corresponding N-substituted aminothialdehydes; N-substituted lactams such as N-methyl-β-propiolactam, N-tert-butyl-β-propiolactam, N-phenyl-β-propiolactam, N-methoxyphenyl-β-propiolactam, N-naphthyl-β-propiolactam, N-methyl-2-pyrrolidone, N-tert-butyl-2-pyrrolidone, N-phenyl-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-tert-butyl-5-methyl -2-pyrrolidone, N-phenyl-5-methyl-2-pyrrolidone, N-methyl-3,3′-dimethyl-2-pyrrolidone, N-tert -butyl-3,3′-dimethyl-2-pyrrolidone, N-phenyl-3,3′-dimethyl -2-pyrrolidone, N-methyl-2-piperidone, N-tert-butyl -2-pyrroldine, N-phenyl-2-piperidone, N-methoxy-phenyl -2-piperidone, N-vinyl-2-piperidone, N-benzyl-2-piperidone, N-naphthyl-2-piperidone, N-methyl-3,3′-dimethyl -2-piperidone, N-phenyl-3,3′-dimethyl-2-piperidone, N-methyl-εcaprolactam, N-phenyl-ε-capro-lactam, N-methoxyphenyl-ε-caprolactm, N-vinyl-ε-capro-lactam, N-benzyl-εcaprolactam, N-naphthyl-ε-caprolactam, 68 -caprolactam, N-methyl-ω-laurylolactam, N-phenyl-ω-laurylolactam, N-tert-butyl-ω-laurylolactam, N-vinyl-ω-laurylolactam, N-benzyl-ω-laurylolactam and the like, and their corresponding thiolactams; N-substituted ethylene ureas such as 1,3-dimethylethylene urea, 1,3-diphenylethylene urea, 1,3-di-tert-butylethylene urea, 1,3-divinylethylene urea and the like, and their corresponding N-substituted thioethylene ureas, i.e. compounds having, in the molecule, an atomic group represented by the

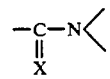

(X represents an O or S atom). The organic compound is used in an amount of ordinarily 0.05–10 moles, preferably 0.2–2 moles, per mole of the polymerization catalyst. The reaction proceeds ordinarily at room temperature to 100° C. in few seconds to few hours. After the completion of the reaction, the reaction mixture is subjected to steam stripping to recover a terminal-modified styrene-butadiene copolymer rubber.

In the present invention, there can also be used, as the copolymer rubber, a styrene-butadiene copolymer rubber subjected to coupling with a known coupling agent such as $SnCl_4$, $SiCl_4$ or the like.

When there is used, as the diene polymer rubber to be blended with the styrene-butadiene copolymer rubber of high trans content, a diene polymer rubber to which the above compound has been added, the resulting rubber composition of the present invention has further improved rolling resistance.

The rubber composition of the present invention can be produced by blending the above-mentioned rubber components and various compounding agents using a mixer such as rolls, Banbury mixer or the like.

The compounding agents used can be appropriately selected from those conventionally used in the rubber industry, so as to meet the application purposes of the rubber composition of the present invention, and have no particular restriction.

As the vulcanizing agent, there can be used sulfur, stearic acid, zinc oxide, various vulcanization accelerators of thiazole type, thiuram type, sulfenamide type and other types, organic peroxides, etc.; as the reinforcing agent, there can be used carbon blacks of various grades such as HAF, ISAF and the like, silica, etc., as other compounding agents, there can be used a process oil, a processing aid, a vulcanization retarder, an antioxidant, etc. The types and use amounts of these compounding agents are not particularly restricted in the present invention and can be appropriately selected so as to meet the application purposes of the rubber composition of the present invention.

The properties of the polymers are shown in Table 1.

TABLE 1

| Polymer | Amounts fed into reactor | | | | Reaction substance | Properties of polymer formed | | |
|---|---|---|---|---|---|---|---|---|
| | Styrene (g) | Butadiene (g) | Mg/Al (M) | Ba (mM) | | Styrene (%) | Trans (%) | $ML_{1+4}$, 100° C. |
| A | 0 | 1,000 | 0.018 | 2.5 | N-methyl-2-pyrrolidone | 0 | 93.4 | 35.2 |
| B | 50 | 950 | 0.018 | 2.4 | N-vinyl-2-pyrrolidone | 5.1 | 92.7 | 36.4 |
| C | 120 | 880 | 0.017 | 2.4 | N-methyl-caprolactam | 12.5 | 92.3 | 33.7 |
| D | 120 | 880 | 0.018 | 2.4 | Not used | 12.6 | 92.4 | 38.1 |
| E | 180 | 820 | 0.019 | 2.5 | Diethylamino-benzophenone | 17.7 | 92.1 | 38.7 |
| F | 230 | 770 | 0.020 | 2.6 | N-methyl-2-pyrrolidone | 23.1 | 91.5 | 35.3 |
| G | 120 | 880 | 0.016 | 2.5 | N-vinyl-2-pyrrolidone | 12.1 | 85.8 | 37.1 |
| H | 120 | 880 | 0.010 | 2.7 | Dimethylimid-azolidinone | 11.9 | 74.7 | 45.2 |

According to the present invention, there can be obtained a rubber composition improved in fracture resistance, abrasion resistance, crack resistance and balance in rolling resistance and wet skid, as compared with conventional compositions. The rubber composition of the present invention is suitable for use in tread portions of passenger car tires and large-sized tires.

The present invention is described more specifically below by way of Examples. In the following Examples and Comparative Examples, parts and % are by weight unless otherwise specified.

The micro structure (cis-1,4, trans-1,4 and 1,2-bonds) of butadiene unit in the polymer used was measured in accordance with the method of D. Morero et al. [Chim, e Ind., 41, 758 (1959)]using an infrared spectrometer; the styrene content in polymer was measured by effecting a 500 MHz $^1$H-NMR analysis; and the extrapolated onset temperature in DSC curve was taken as Tg (° C.).

PRODUCTION EXAMPLE

Preparation of Solution Polymerization Rubbers to be used later in Examples

A 15-l stainless steel reactor was washed, dried and purged with dry nitrogen. Thereinto were fed 7,000 g of cyclohexane and styrene and 1,3-butadiene of the amounts shown in Table 1. Then there were added a dibutylmagnesium/triethylaluminum complex (molar ratio of Mg/Al =5) and di-tert-butoxybarium in amounts shown in Table 1 (the amount of the complex is based on magnesium). The reactor contents were subjected to polymerization at 60° C. for 5 hours with stirring.

After the completion of the polymerization reaction, a reactive substance shown in Table 1 was added in an amount of 0.05 mole, and an addition reaction was effected. Then, 1.0 ml of methanol was added to terminate the addition reaction. The polymer solution was taken out of the reactor. To the polymer solution was added 8 g of 2,6-di-tert-butyl-p-cresol (BHT). Steam stripping was effected to remove the solvent to coagulate polymers. The coagulated polymers were dehydrated by rolls and vacuum-dried at 60° C. for 24 hours.

EXAMPLE 1

A mixed rubber as rubber component, shown in Table 3 and various compounding agents shown in Table 2 were kneaded in a 250-ml Brabender type mixer to obtain various rubber compositions. The rubber compositions were press cured at 150° C. for 30 minutes. The press cured products were made into test pieces to measure physical properties of the products. The results are shown in Table 3. Incidentally, the Tg of natural rubber (NR) was −67° C.

Properties were measured as follows.

Fracture strength (tensile strength) was measured in accordance with JIS K 6301.

Rebound resilience was measured at 60° C. using a Dunlop tripsometer and converted to an index of rolling resistance.

Abrasion resistance was measured in accordance with ASTM D 2228, using a Goodrich type pico abrasion tester and converted to an index.

Wet skid resistance was measured at 23° C. on a road surface of ASTM E 303-74, using a portable skid tester and converted to an index.

In the above, the index of each property is a value when the value of the same property of the cured product of Run No. 9 was taken as 100.

The results are shown in Table 3.

TABLE 2

| Rubber component | 100 parts by weight |
|---|---|
| Zinc oxide | 3 parts by weight |
| Stearic acid | 2 parts by weight |
| HAF carbon black | 50 parts by weight |
| Aromatic process oil | 5 parts by weight |
| N-cyclohexyl-2-benzothiazylsulfenamide | 1 part by weight |
| Sulfur | 1.75 parts by weight |

As is clear from the results of Table 3, each of the rubber compositions of the present invention retains a high level of a tensile strength and is improved in abrasion resistance as well as in balance in wet skid resistance and rolling resistance (rebound resilience).

TABLE 3

| | Invention | | | | | Comparison | | | |
|---|---|---|---|---|---|---|---|---|---|
| Run No. | 1 | 2 | 3 | 4 | 5 | 6 | 7 | 8 | 9 |
| Polymer | | | | | | | | | |

TABLE 3-continued

| Run No. | Invention | | | | | Comparison | | | |
|---|---|---|---|---|---|---|---|---|---|
| | 1 | 2 | 3 | 4 | 5 | 6 | 7 | 8 | 9 |
| A | | | | | | | | 25 | |
| B | 25 | | | | | | | | |
| C | | 25 | | | | | | | |
| D | | | 25 | | | | | | |
| E | | | | 25 | | | | | |
| F | | | | | 25 | | | | |
| G | | | | | | 25 | | | |
| H | | | | | | | 25 | | |
| SBR-1 (*1) | | | | | | | | | 25 |
| NR (RSS#3) | 75 | 75 | 75 | 75 | 75 | 75 | 75 | 75 | 75 |
| Tensile strength (kg/cm²) | 282 | 291 | 265 | 281 | 283 | 261 | 254 | 287 | 253 |
| Abrasion resistance | 137 | 138 | 115 | 130 | 129 | 107 | 98 | 142 | 100 |
| Wet skid resistance | 105 | 110 | 111 | 114 | 117 | 108 | 109 | 94 | 100 |
| Rolling resistance | 104 | 102 | 100 | 102 | 102 | 92 | 90 | 101 | 100 |

(*1) Produced using n-butyl lithium catalyst (hereinafter referred to as Li-SBR)
styrene content = 17.2%, 1,2-bond content = 11.3%, Tg = −76° C., Mooney viscosity = 33.

EXAMPLE 2

Using a mixed rubber (as rubber component) consisting of the polymer C of Table 1 and a diene rubber having a Tg of lower or higher than −60° C., shown in Table 4, there were prepared rubber compositions according to the compounding recipes shown in Table 2. The compositions were press cured at 150° C. for 30 minutes. The resulting cured products were measured for physical properties, and the uncured rubber compositions were measured for processability. The measurement of processability was effected by observing the operability of each composition during roll kneading and rating it in three levels. (In Table 4, ○ refers to "good bandability"; Δ refers to "bands at the early stage but causes bagging from the intermediate stage"; and × refers to "floats without banding".)

Crack resistance was obtained by measuring the times of flexing up to the appearance of cracks in accordance with JIS K 6301, using a De Mattia flexing machine, and then converting the times to an index.

The results are shown in Table 4. In Table 4, the index of each property is a value when the value of the same property of natural rubber (Run No. 13) was taken as 100.

TABLE 4

| Run No. | Invention | | | | | Comparison | |
|---|---|---|---|---|---|---|---|
| | 10 | 11 | 12 | 13 | 14 | 15 | 16 |
| Polymer C | 25 | 25 | 25 | 25 | 25 | 25 | 25 |
| SBR-1 (*1) | 75 | | | | | | |
| SBR-2 (*2) | | | | | | | 75 |
| SBR-3 (*3) | | 75 | | | | | |
| SBR-4 (*4) | | | | | | 75 | |
| SBR-5 (*5) | | | | | | | 75 |
| BR (*6) | | | 75 | | | | |
| NR (RSS#3) | | | | 75 | | | |
| Tensile strength (kg/cm²) | 254 | 250 | 251 | 291 | 248 | 245 | 241 |
| Abrasion resistance | 115 | 107 | 107 | 100 | 89 | 93 | 90 |
| Crack resistance | 100 | 100 | 100 | 100 | 94 | 96 | 91 |

TABLE 4-continued

| Run No. | Invention | | | | | Comparison | |
|---|---|---|---|---|---|---|---|
| | 10 | 11 | 12 | 13 | 14 | 15 | 16 |
| Processability | ○ | ○ | ○ | ○ | Δ | Δ | Δ |

(*1) Same as (*1) of Table 3.
(*2) Li-SBR; styrene content = 14%, 1,2-bond content = 72%, Tg = −28° C., Mooney viscosity = 32.
(*3) Li-SBR; styrene content = 15%, 1,2-bond content = 34%, Tg = −63° C., Mooney viscosity = 39.
(*4) Li-SBR; styrene content = 24%, 1,2-bond content = 37%, Tg = −49° C., Mooney viscosity = 35.
(*5) Li-BR (polybutadiene); 1,2-bond content = 76%, Tg = −40° C., Mooney viscosity = 35.
(*6) polybutadiene; cis 1,4-bond content = 98%, Tg = −115° C., Mooney viscosity = 43.

As is clear from Table 4, the rubber compositions of the present invention comprising a diene rubber having a Tg of lower than −60° C. are significantly improved in abrasion resistance and crack resistance.

EXAMPLE 3

Various rubber blends were prepared by blending the polymer C of Table 1 and natural rubber in various proportions as shown in Table 5.

The blends were press cured at 150° C. for 30 minutes according to the compounding recipe shown in Table 2 to obtain cured products. The cured products were measured for physical properties. The results are shown in Table 5.

TABLE 5

| Run No. | Comparison | Invention | | | Comparison |
|---|---|---|---|---|---|
| | 17 | 18 | 19 | 20 | 21 |
| Polymer C | 50 | 35 | 25 | 15 | |
| NR (RSS#1) | 50 | 65 | 75 | 85 | 100 |
| Tensile strength (kg/cm²) | 272 | 285 | 291 | 298 | 307 |
| Abrasion resistance | 167 | 159 | 141 | 124 | 100 |
| Crack resistance | 87 | 100 | 100 | 100 | 100 |

We claim:
1. A rubber composition comprising, as rubber components, 10-40% by weight of (1) a styrene-butadiene copolymer rubber obtained by solution polymerization, having a styrene content of less than about 23.1% by weight and a trans-1,4 bond content in butadiene portion, of more than 90% by weight and 60-90 % by weight of (2) a diene rubber other than the styrene-butadiene copolymer rubber (1), having a glass transition temperature of −60° C. or below wherein the styrene-butadiene copolymer rubber (1) is a reaction product of a styrene-butadiene copolymer rubber having active terminals, with at least one compound selected from the group consisting of N-substituted amino ketones, N-substitutes thioaminoketones, N-substituted amino-aldehydes, N-substituted thioaminoaldehydes, N-substituted lactams, N-substituted thiolactams, N-substituted ethylene ureas and N-substituted thioethylene ureas.

2. A rubber composition according to claim 1, wherein the styrene content of the styrene-butadiene copolymer rubber (1) is 5-15% by weight.

3. A rubber composition according to claim 1, wherein the diene rubber (2) is at least one diene rubber selected from natural rubber, a polybutadiene rubber, a polyisoprene rubber, a styrene-butadiene copolymer rubber and a styrene-isoprene copolymer rubber.

4. A rubber composition according to claim 1 wherein the styrene-butadiene copolymer rubber (1) is present in amount of about 15 to 30% by weight.

5. A rubber composition according to claim 1 wherein the diene rubber (2) is present in amount of about 70 to 85% by weight.

6. A rubber composition according to claim 1 wherein the styrene-butadiene copolymer rubber (1) is further coupled with a coupling agent selected from the group consisting of $SnCl_4$ and $SiCl_4$.

7. A rubber composition according to claim 1 wherein the styrene-butadiene copolymer has a styrene content of about 23.1% by weight and a trans-1,4 bond content of about 91.5%.

8. A rubber composition according to claim 1 wherein the styrene-butadiene copolymer rubber (1) is a reaction product of a styrene-butadiene copolymer rubber having active terminals, with at least one compound selected from the group consisting of N-methyl-caprolactam, N-methyl-2-pyrrolidone, N-vinyl-2-pyrrolidone, dimethylimid-azolidinone, and diethylamino-benzophenone.

9. A rubber composition according to claim 1 wherein the diene rubber (2) is at least one diene rubber obtained by anionic polymerization in presence of n-butyl lithium catalyst.

10. A rubber composition according to claim 9 wherein the diene rubber (2) has the styrene content of at least about 14% by weight, a 1,2-bond content of at least about 11.3% and Mooney ML at 100° C. viscosity of at least 32.

* * * * *